United States Patent
Zeng et al.

(10) Patent No.: US 9,001,467 B1
(45) Date of Patent: Apr. 7, 2015

(54) METHOD FOR FABRICATING SIDE SHIELDS IN A MAGNETIC WRITER

(71) Applicant: Western Digital (Fremont), LLC, Fremont, CA (US)

(72) Inventors: Xianzhong Zeng, Fremont, CA (US); Mingjun Yu, Sunnyvale, CA (US); Hai Sun, Milpitas, CA (US); Donghong Li, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/300,035

(22) Filed: Jun. 9, 2014

Related U.S. Application Data

(60) Provisional application No. 61/948,390, filed on Mar. 5, 2014.

(51) Int. Cl.
  *G11B 5/31* (2006.01)
  *G03F 7/20* (2006.01)
  *G11B 5/11* (2006.01)

(52) U.S. Cl.
  CPC . *G11B 5/112* (2013.01); *G03F 7/20* (2013.01)

(58) Field of Classification Search
  USPC ...................................... 360/235.4
  See application file for complete search history.

(56) References Cited

U.S. PATENT DOCUMENTS

| | | | |
|---|---|---|---|
| 4,529,860 A | 7/1985 | Robb | |
| 5,017,459 A | 5/1991 | McColgin | |
| 5,332,653 A | 7/1994 | Cullen et al. | |
| 5,661,083 A | 8/1997 | Chen et al. | |
| 5,798,303 A | 8/1998 | Clampitt | |
| 5,798,897 A | 8/1998 | Chang et al. | |
| 5,994,226 A | 11/1999 | Kadomura | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |

(Continued)

OTHER PUBLICATIONS

Cameron et al., "Developable BARC (DBARC) Technology as a Solution to Today's Implant Lithography Challenges" Advances in Resist Materials and Processing Technology XVIII R. Allen, M. Somervell, Proc. of SPIE vol. 7972, 797214 1-10, Feb. 27, 2011.

(Continued)

*Primary Examiner* — Mark Blouin

(57) ABSTRACT

A method and system provide a magnetic transducer having an air-bearing surface (ABS) location, a pole and a gap. The pole has a bottom and a top wider than the bottom. The gap is on the top of the pole and at least as wide as the top of the pole such that an overhang is formed between a top edge of the gap and a bottom edge of the bottom of the pole. The method includes providing a plurality of bottom antireflective coatings (BARCs). The plurality of BARCs form a BARC layer that fills the overhang. A shield photoresist mask is provided on at least a portion of the BARC layer. The shield, which includes at least one side shield, is provided.

15 Claims, 6 Drawing Sheets

(56) References Cited

U.S. PATENT DOCUMENTS

| | | |
|---|---|---|
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,111,724 A | 8/2000 | Santini |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,309,976 B1 | 10/2001 | Lin et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,451,706 B1 | 9/2002 | Chu et al. |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,586,560 B1 | 7/2003 | Chen et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,627,355 B2 | 9/2003 | Levinson et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,649,531 B2 | 11/2003 | Cote et al. |

(56) References Cited

U.S. PATENT DOCUMENTS

| | | |
|---|---|---|
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,787,475 B2 | 9/2004 | Wang et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,900,134 B1 | 5/2005 | Shih et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,951,823 B2 | 10/2005 | Waldfried et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,984,585 B2 | 1/2006 | Ying et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,253,115 B2 | 8/2007 | Tanaka et al. |
| 7,265,060 B2 | 9/2007 | Tsai et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,297,638 B2 | 11/2007 | An et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,371,507 B2 | 5/2008 | Myung |

(56) References Cited

U.S. PATENT DOCUMENTS

| | | |
|---|---|---|
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,390,753 B2 | 6/2008 | Lin et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,095 B2 | 9/2008 | Benakli et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,547,669 B2 | 6/2009 | Lee |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,605,006 B2 | 10/2009 | Morijiri et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,674,755 B2 | 3/2010 | Egbe et al. |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,700,533 B2 | 4/2010 | Egbe et al. |
| 7,718,543 B2 | 5/2010 | Huang et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |

(56) References Cited

U.S. PATENT DOCUMENTS

| | | | |
|---|---|---|---|
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 * | 8/2014 | Bai et al. .................. 360/125.15 |
| 8,797,692 B1 | 8/2014 | Guo et al. |
| 8,813,324 B2 | 8/2014 | Emley et al. |
| 2001/0022704 A1 | 9/2001 | Hong |
| 2002/0034043 A1 | 3/2002 | Okada et al. |
| 2003/0100190 A1 | 5/2003 | Cote et al. |
| 2004/0214448 A1 | 10/2004 | Chan et al. |
| 2005/0141137 A1 | 6/2005 | Okada et al. |
| 2006/0044682 A1 | 3/2006 | Le et al. |
| 2006/0216649 A1 | 9/2006 | Paxton et al. |
| 2009/0029557 A1 | 1/2009 | Kikuchi et al. |
| 2009/0098490 A1 | 4/2009 | Pham et al. |
| 2009/0173977 A1 | 7/2009 | Xiao et al. |
| 2009/0192065 A1 | 7/2009 | Korzenski et al. |
| 2009/0246958 A1 | 10/2009 | Burns et al. |
| 2010/0112486 A1 | 5/2010 | Zhang et al. |
| 2010/0290157 A1 | 11/2010 | Zhang et al. |
| 2010/0302680 A1 | 12/2010 | Hirata et al. |
| 2010/0321831 A1 * | 12/2010 | Demtchouk et al. ........ 360/235.4 |

(56) References Cited

U.S. PATENT DOCUMENTS

| | | |
|---|---|---|
| 2011/0086240 A1 | 4/2011 | Xiang et al. |
| 2011/0147222 A1 | 6/2011 | Pentek et al. |
| 2011/0151279 A1 | 6/2011 | Allen et al. |
| 2011/0233167 A1 | 9/2011 | Pentek et al. |
| 2011/0262774 A1 | 10/2011 | Pentek et al. |
| 2011/0273800 A1 | 11/2011 | Takano et al. |
| 2011/0279926 A1 | 11/2011 | Si et al. |
| 2012/0050915 A1 | 3/2012 | Hong et al. |
| 2012/0111826 A1 | 5/2012 | Chen et al. |
| 2012/0125885 A1 | 5/2012 | Chen et al. |
| 2012/0127612 A1 | 5/2012 | Shin et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0022840 A1 | 1/2013 | Hsiao et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Brewer Science, Inc., "ARC DS-K101 MSDS sheet". 5 pages (Jan. 2009).

\* cited by examiner

US 9,001,467 B1

METHOD FOR FABRICATING SIDE SHIELDS IN A MAGNETIC WRITER

CROSS-REFERENCE TO RELATED APPLICATIONS

This application claims priority to provisional U.S. Patent Application Ser. No. 61/948,390, filed on Mar. 5, 2014, which is hereby incorporated by reference in its entirety.

BACKGROUND

FIG. 1 depicts a conventional method 10 for fabricating side shields for a conventional magnetic recording head. The method starts after a main pole and top gap have been provided. Any material adjacent to the side gap and top gap may also have been removed. A single bottom antireflective coating (BARC) layer is provided, via step 12. Step 12 includes spin coating an organic BARC layer such that the BARC layer covers at least the main pole and the region around the pole. A photoresist mask is provided on the BARC layer, via step 14. Step 14 may include providing a photoresist layer, selectively exposing portions of the photoresist layer to light, and using a developer to remove portions of the photoresist layer. The photoresist mask has an aperture for the side shields. The side shield(s) may then be provided, via step 16. Step 16 may include plating the magnetic materials, such as NiFe, for the shields. The side shields may be part of a wraparound shield.

FIG. 2 depicts an ABS view of a conventional magnetic recording head 50 formed using the method 10. The magnetic recording transducer 50 may be a perpendicular magnetic recording (PMR) head. The conventional magnetic recording transducer 50 may be a part of a merged head including the write transducer 50 and a read transducer (not shown). Alternatively, the magnetic recording head may be a write head including only the write transducer 50. The conventional transducer 50 includes an underlayer 52, side gap 54, main pole 60, side shields 70, top (write) gap 62, and optional top (trailing) shield 72.

The main pole 60 resides on an underlayer 52 and includes sidewalls. The underlayer 52 may also include a leading shield. The sidewalls of the conventional main pole 60 form an angle with the down track direction at the ABS and may form a different angle with the down track direction at the distance recessed from the ABS. The width of the main pole 60 may also change in a direction recessed from the ABS.

The side shields 70 are separated from the main pole 60 by a side gap 54. The side shields 70 extend a distance back from the ABS. The trailing shield 72 is separated from the main pole by gap 62. The side shields 70 and trailing shield 72 may be considered to form a wraparound shield.

Although the conventional magnetic recording head 50 functions, there are drawbacks. In particular, the conventional magnetic recording head 50 may suffer from issues due to photoresist residue. For example, resist residue 80 may reside under the top gap 62. The resist residue 80 may remain after fabrication because the photoresist may be difficult to develop under the top gap 62. The presence of the resist residue 80 may adversely affect reliability and performance. Accordingly, what is needed is a system and method for improving the performance of a magnetic recording head.

DETAILED DESCRIPTION OF THE PREFERRED EMBODIMENTS

Figure 1:
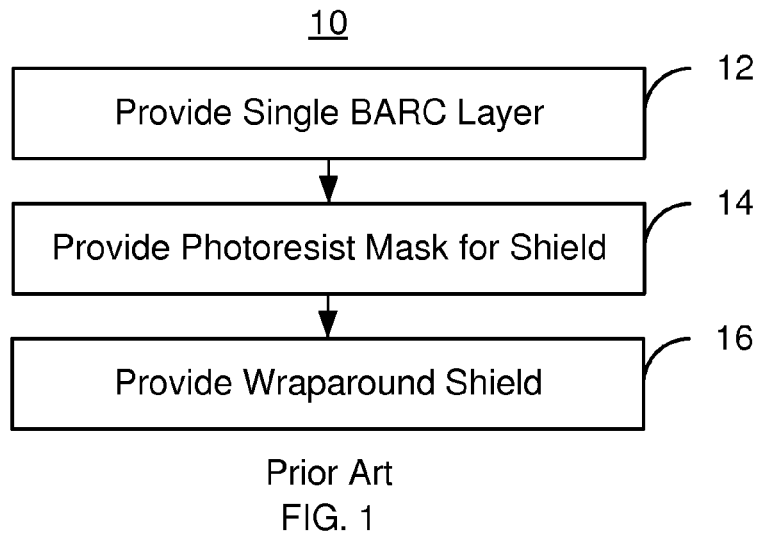
FIG. 1 is a flow chart of a conventional method for fabricating a magnetic recording head.
Figure 2:
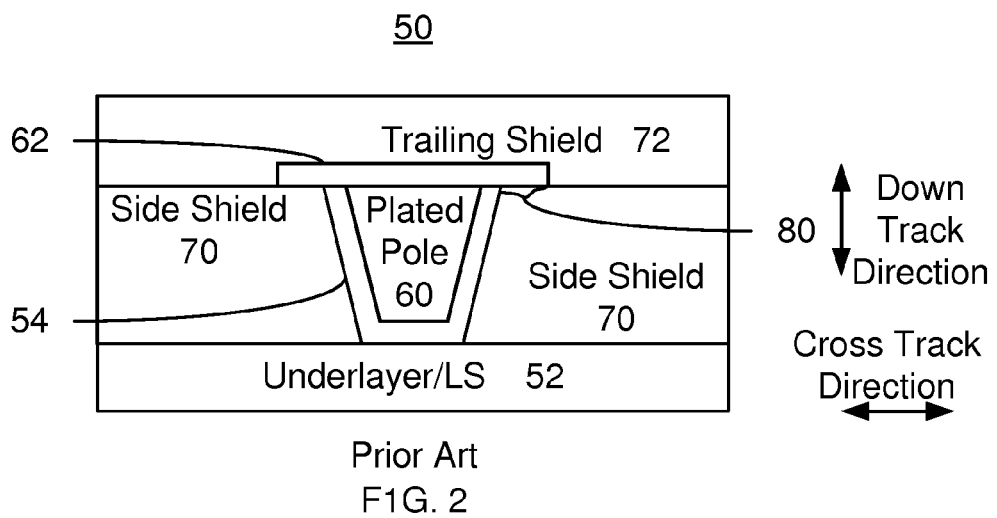
FIG. 2 depicts a conventional magnetic recording transducer.
Figure 3:
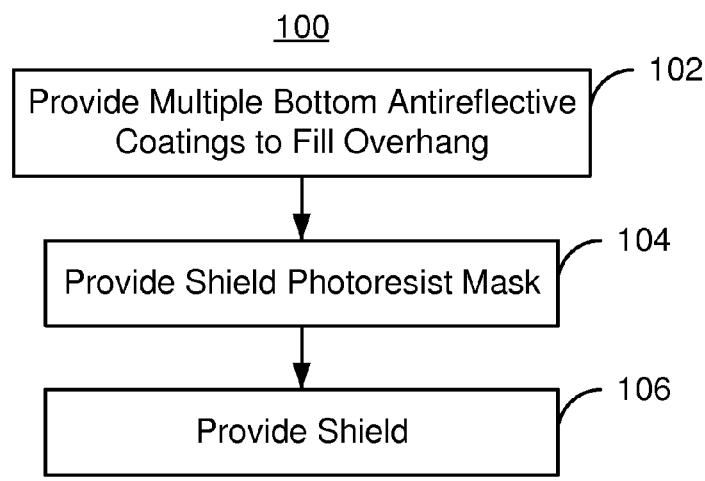
FIG. 3 depicts a flow chart of an exemplary embodiment of a method for providing shields for a magnetic recording transducer.

FIG. 3 depicts an exemplary embodiment of a method 100 for providing a magnetic recording transducer. For simplicity, some steps may be omitted, interleaved, combined, have multiple substeps and/or performed in another order unless otherwise specified. The method 100 is described in the context of providing a magnetic recording disk drive and transducer. However, the method 100 may be used to fabricate multiple magnetic recording transducers at substantially the same time. The method 100 is also described in the context of particular layers. A particular layer may include multiple materials and/or multiple sub-layers. The method 100 also may start after formation of other portions of the magnetic recording head. For example, the method 100 may start after a read transducer, return pole/shield and/or other structure have been fabricated. The method 100 may start after the main pole and write/trailing gap have been formed. The pole has a bottom and a top wider than the bottom. The gap residing on the top of the pole and is at least as wide as the top of the pole. Consequently, overhangs are formed between the top edges of the gap and the bottom edges of the bottom of the pole. In addition, the nonmagnetic intermediate layer has also been removed in the region in which the shields are to be fabricated.

A plurality of bottom antireflective coatings (BARCs) are provided, via step 102. For example, step 102 may including spin coating multiple BARCs. For example, a first BARC may be spin coated. A second BARC may be spin coated on the first BARC. In some embodiments a third BARC may be spin coated on the second BARC, and so on. The BARCs can be considered to form a BARC layer. The BARC layer fills the overhangs. Stated differently, the region between the top edges of the gap and the bottom edges of the pole are filled by BARC layer. In some embodiments, the sides of the pole and bottom of the gap in the overhang may be considered to be sealed by the BARC. In some embodiments, each of the BARCs has a thickness of at least twenty nanometers and not more than sixty nanometers. In some such embodiments, each of the BARCs has the thickness of at least twenty-five nanometers and not more than thirty-five nanometers. The total thickness of the BARC layer formed from the BARCs is sufficient to fill the overhang. The BARCs may be organic BARCs. In some embodiments, the BARCs are developable BARCs. In such embodiments, the material used for the BARCs is removable using a developer, such as one which would be used in developing a photoresist mask.

After the BARC layer is provided from the multiple BARCs in step 102, a shield photoresist mask is provided, via step 104. The shield photoresist mask is on at least a portion of the BARC layer. The mask provided in step 104 has an aperture in the region in which the shields are to be formed. Thus, the aperture exposes a section of the BARC layer. Step 104 may include depositing a photoresist layer and selectively exposing a portion of the photoresist layer to light. A portion of the photoresist layer is then removed, forming the photoresist mask. For example, the photoresist layer may be immersed in a developer in order to remove part of the photoresist layer corresponding to the aperture. The developer may also remove a portion of BARC layer under the aperture. Thus, the region around the pole may be prepared for deposition of the shield material.

The shield(s) are provided, via step 106. The shield(s) includes side shields and may include a trailing (top) shield. Step 106 may include depositing a seed layer and plating a high permeability material, such as NiFe. If only side shields are desired or the trailing shield is desired to be separated from the side shields, then step 106 may also include removing a portion of the shield material above the main pole.

Using the method 100, a magnetic transducer having improved performance may be fabricated. Use of the BARC layer reduces or eliminates reflections from underlying topography that may adversely affect formation of the photoresist mask in step 104. Thus, a mask having the desired features may be formed. The desired geometry, and thus performance, of the transducer may be more readily achieved. Because the BARC layer fills the overhang, photoresist does not occupy any portion of the region under the overhang during formation of the photoresist mask in step 104. Further, the BARC layer may be removed by the developer or other method. This is in contrast to the photoresist, which may have to be exposed to light to be removable. As a result, photoresist residue under the overhang may be prevented. Performance and reliability of the transducer formed using the method 100 may thus be improved. Note that the BARC layer formed of multiple BARCs performs its functions better than a single BARC that is thick enough to fill the overhang. For example, a single BARC having a thickness that is the same as the BARC layer formed of multiple BARCs may not adequately fill the overhang. Thus, performance and reliability of the transducer formed using the method 100 may be improved without significantly complicating processing.

Figure 4:
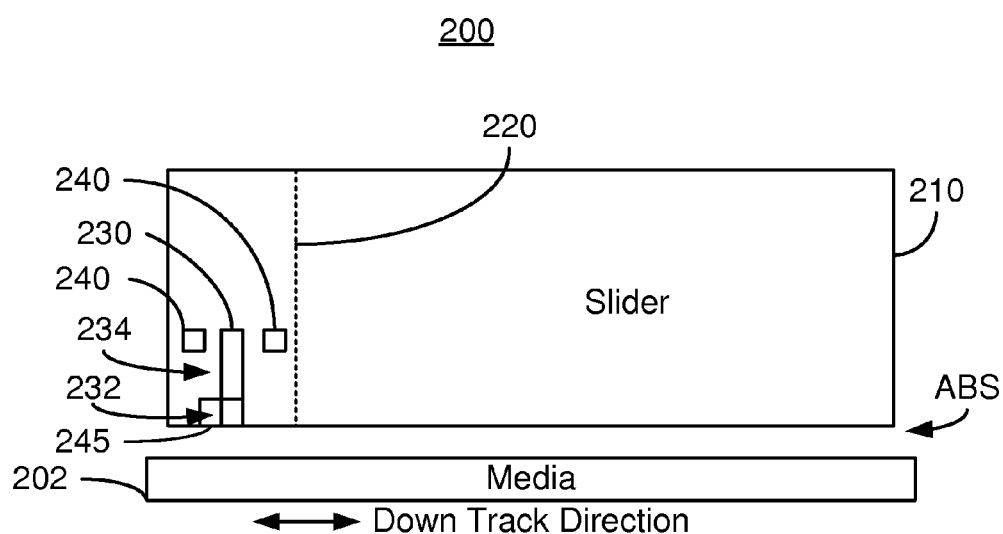
FIG. 4 depicts an exemplary embodiment of a disk drive.
Figure 5A:
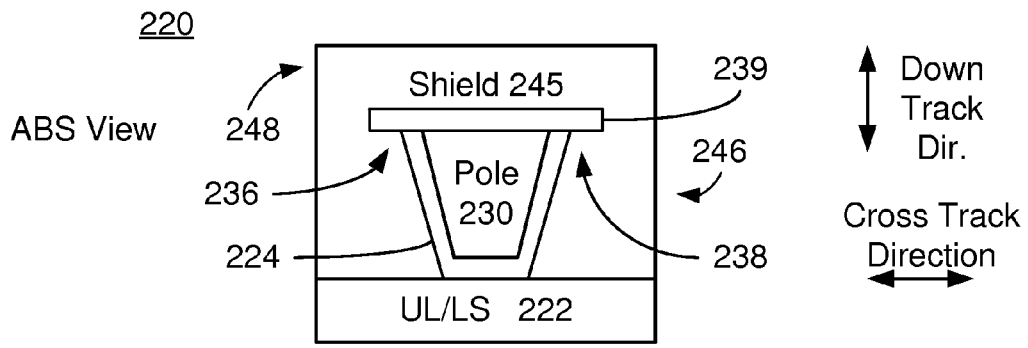
FIGS. 5A and 5B depict ABS and apex views of an exemplary embodiment of a magnetic recording transducer.
Figure 5B:
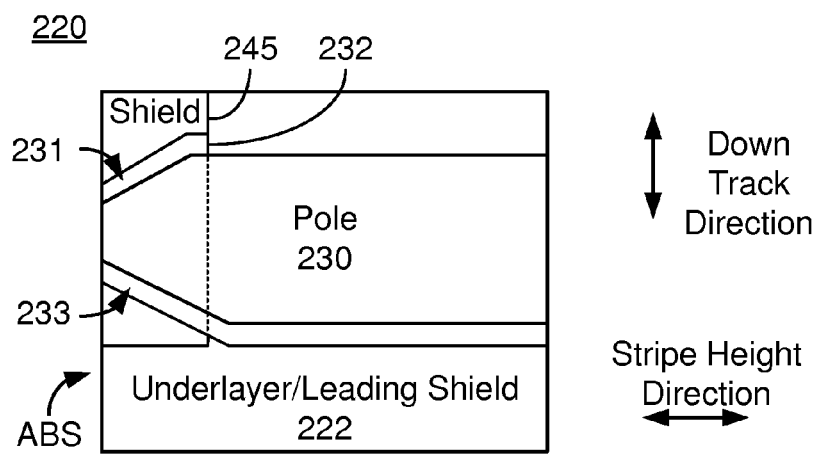

FIGS. 4 and 5A-5B depict various views of a disk drive and transducer formed using the method 100. FIG. 4 depicts a side view of an exemplary embodiment of a portion of a disk drive 200 including a write transducer 220. FIGS. 5A and 5B depict ABS and cross-sectional side (apex) views, respectively, of the transducer 220. For clarity, FIGS. 4, 5A and 5B are not to scale. For simplicity not all portions of the disk drive 200 and transducer 220 are shown. In addition, although the disk drive 200 and transducer 220 are depicted in the context of particular components other and/or different components may be used. For example, circuitry used to drive and control various portions of the disk drive 200 is not shown. For simplicity, only single components 202, 210, 220, 224, 230, 239 240 and 245 are shown. However, multiples of each components 202, 210, 220, 224, 230, 239, 240, 245 and/or their sub-components, might be used. The disk drive 200 may be a perpendicular magnetic recording (PMR) disk drive. However, in other embodiments, the disk drive 200 may be configured for other types of magnetic recording included but not limited to heat assisted magnetic recording (HAMR).

The disk drive 200 includes media 202, a slider 210 and a write transducer 220. Additional and/or different components may be included in the disk drive 200. Although not shown, the slider 210 and thus the transducer 220 are generally attached to a suspension (not shown). The transducer 220 is fabricated on the slider 210 and includes an air-bearing surface (ABS) proximate to the media 202 during use. In general, the disk drive 200 includes a write transducer 220 and a read transducer (not shown). However, for clarity, only the write transducer 220 is shown. The transducer 220 includes a main pole 230, coils 240, shields 245, side gap 224 and top/write gap 232. In other embodiments, different and/or additional components may be used in the write transducer 220.

The coil(s) 240 are used to energize the main pole 230. Two turns 240 are depicted in FIG. 4. Another number of turns may, however, be used. Note that only a portion of the coil(s) 240 is shown in FIG. 4. If, for example, the coil(s) 240 form a helical coil, then additional portion(s) of the coil(s) 240 may be located on the opposite side of the main pole 230 as is shown. If the coil(s) 240 is a spiral, or pancake, coil, then additional portions of the coil(s) 222 may be located further from the ABS. Further, additional coils may also be used.

The main pole 230 includes a pole tip region 232 close to the ABS and a yoke region 234 recessed from the ABS. The pole tip region 232 is shown as having top and bottom bevels 231 and 233, respectively, near the ABS. The sidewalls and form sidewall angles with the down track direction.

Also shown are side gaps 224 and top gap 232 that separate the main pole 230 from the shield 245. As can best be seen in FIGS. 5A-5B, the gaps 224 and 232 may be formed separately or together. The gaps 224 and 232 are nonmagnetic and may include the same or different material(s). In the ABS view, the side gap 224 is conformal to the sidewalls of the pole 230. However, recessed from the ABS, the side gap 224 may not be conformal with the pole 230. The shield 245 is depicted as including a side shield portion 246 and a trailing shield 248. The side shields 246 are adjacent to the sides of the main pole 230 and the side gap 224. The trailing shield 238 is on top of the main pole and adjacent to the top gap 232. Because the gap 232 extends further in the cross track direction than the top of the main pole 230, there are overhangs 236 and 238 on the sides of the main pole 230. The overhangs 236 and 238 may be larger at their bottom of the main pole 230 because the top of the pole 230 is wider than the bottom.

The magnetic disk drive 200 may exhibit improved performance. As can be seen in FIG. 5A, the overhangs 236 and 238 are free of photoresist residue. Thus, the transducer 220 is less prone to the presence of resist residue that adversely affects performance and reliability. This may be achieved without significantly complicating processing of the transducer 200.

Figure 6:
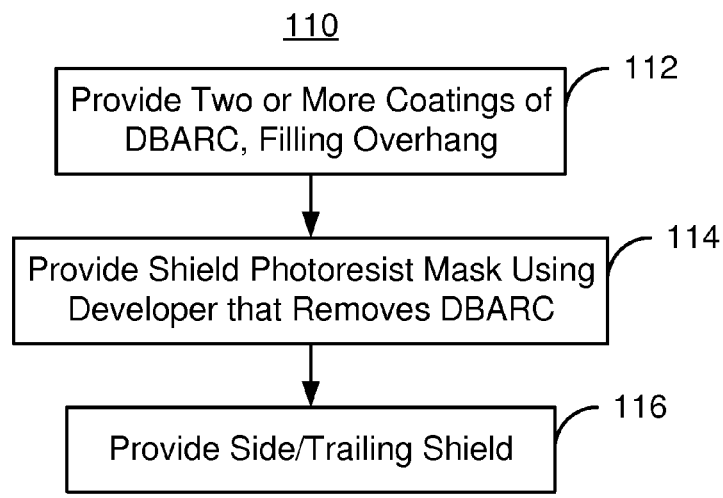
FIG. 6 depicts a flow chart of another exemplary embodiment of a method for providing a magnetic recording transducer.

FIG. 6 depicts an exemplary embodiment of a method 110 for providing a magnetic recording transducer. For simplicity, some steps may be omitted, interleaved, performed in another order (unless otherwise indicated) and/or combined. The method 110 is described in the context of providing a magnetic recording disk drive 200 and transducer 220 depicted in FIGS. 4 and 5A-5B. However, the method 110 may be used to fabricate multiple magnetic recording heads at substantially the same time. The method 110 may also be used to fabricate other magnetic recording transducers. The method 110 is also described in the context of particular layers. A particular layer may include multiple materials and/or multiple sub-layers. The method 110 also may start after formation of other portions of the magnetic recording head. For example, the method 110 may start after a read transducer, return pole/shield and/or other structure have been fabricated. Further, the method 110 may start after the pole 230, side gap 224 and top gap 232 are formed.

Referring to FIGS. 4, 5A-5B and 6, two or more coatings of developable BARC (DBARC) are provided, via step 112. Step 112 may including spin coating multiple BARCs. For example, a first DBARC may be spin coated. A second DBARC may be spin coated on the first DBARC, and so on. This process would be continued at least until the overhangs are filled. For example, if two DBARCs are used, in some embodiments, each of DBARC has a thickness of at least twenty nanometers and not more than sixty nanometers. In some such embodiments, each DBARC has the thickness of at least twenty-five nanometers and not more than thirty-five nanometers. For two DBARCs, the total thickness of the DBARC layer formed may be in the range of forty to one hundred twenty nanometers. In some such embodiments, the DBARC layer is at least fifty and not more than seventy nanometers thick. Such a thickness is sufficient to fill the overhang. The DBARCs may be organic.

A shield photoresist mask is provided, via step 114. Formation of the photoresist mask would use the developer that can remove the DBARC layer. Thus, the process that provides the aperture(s) in the photoresist mask would also remove the underlying DBARC layer. Step 114 may include depositing the appropriate photoresist and selectively exposing portion(s) of the photoresist layer to light. The photoresist layer would then be exposed to the developer. Thus, the photoresist and DBARC around the pole 230 may be removed. The underlayer/leading shield 222, gap 224 and top gap 232 may thus be exposed in the region the shield(s) are to be manufactured.

The shield(s) 245 are provided, via step 116. Step 116 may include depositing a seed layer (not shown in FIGS. 4, 5A and 5B) and plating a high permeability material. Thus, side shields 246 and trailing shield 248 may be formed. In some embodiments, the trailing shield 248 may be removed.

Using the method 110, a magnetic transducer having improved performance may be fabricated. Use of the DBARC layer not only improves fabrication of the photoresist mask by reducing or eliminating reflections, but also prevents or mitigates the presence of photoresist residue in the overhang regions 236 and 238. The desired geometry, performance, and reliability of the transducer 220 and disk drive 200 may be more readily achieved.

Figure 7:
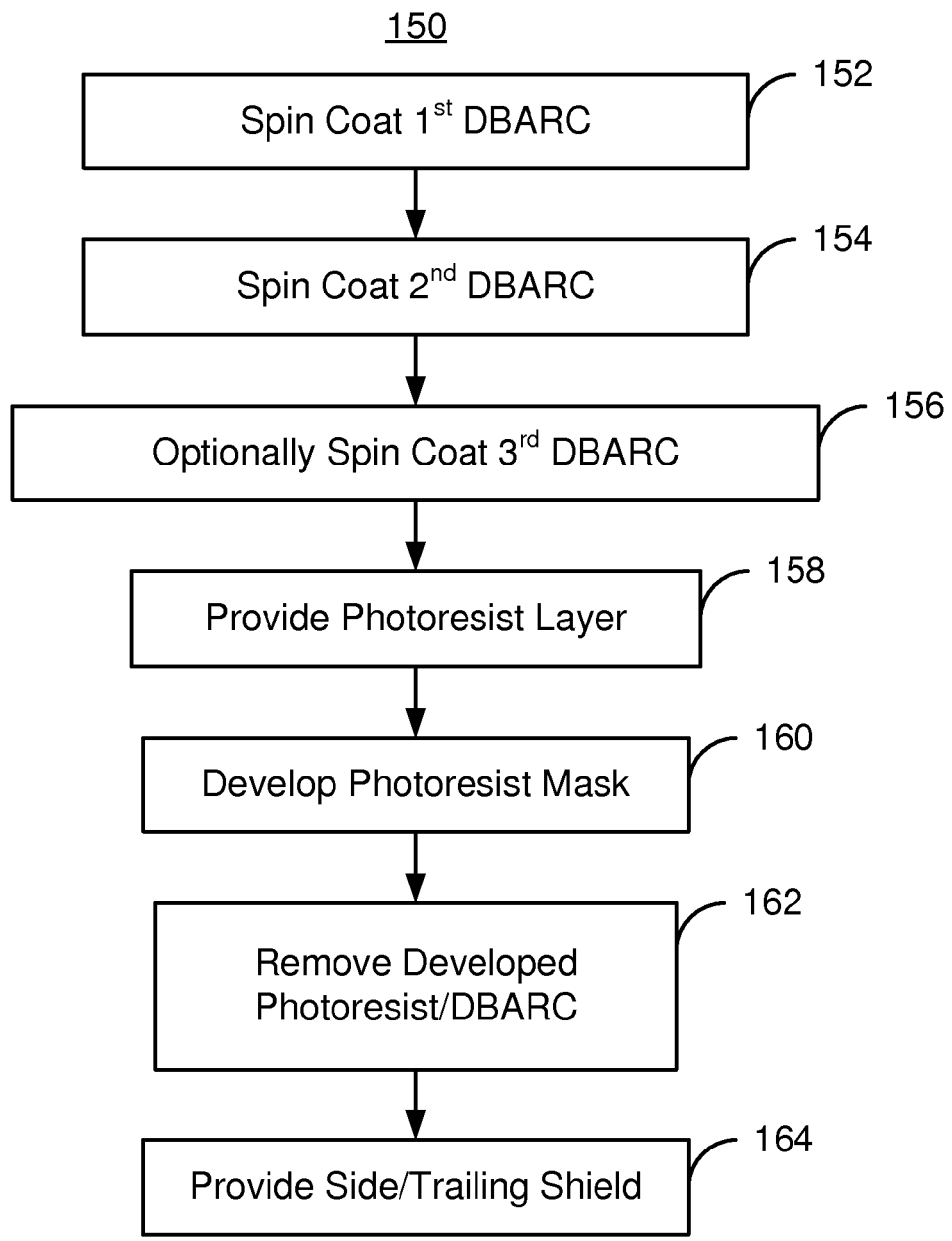
FIG. 7 depicts a flow chart of another exemplary embodiment of a method for providing a magnetic recording transducer.
Figure 8:
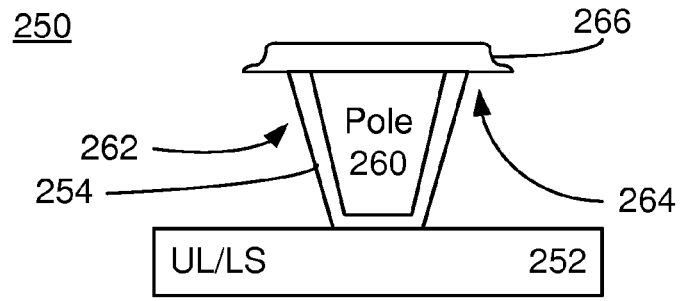
FIGS. 8-14 depict ABS views of an exemplary embodiment of a magnetic recording transducer fabricated using the method.

FIG. 7 depicts an exemplary embodiment of a method 150 for providing a magnetic recording transducer. For simplicity, some steps may be omitted, interleaved, performed in another order unless otherwise indicated and/or combined. FIGS. 8-14 depict ABS views of an exemplary embodiment of a transducer 250 during fabrication using the method 150. Referring to FIGS. 7-14, the method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated. In addition, the method 150 starts after formation of the pole and gaps. For example, FIG. 8 depicts the transducer 250 before the first step of the method 150. An underlayer 252 that may include a leading shield is present. The main pole 260 and side gaps 254 have also been formed. The side gap 254 may be a seed layer deposited in a trench in an intermediate layer. The pole 260 is formed in the trench. The intermediate layer may then be removed at least in the region shown. In other embodiments, the pole may be formed from full film deposited pole material(s), which are then milled away or otherwise removed to form the pole 260. The top gap 266 is also shown. Overhangs 262 and 264 exist on the sides of the main pole 260 in part because the gap 266 is wider than the top of the pole 260 and in part because the bottom of the pole 260 is narrower than the top.

Figure 9:
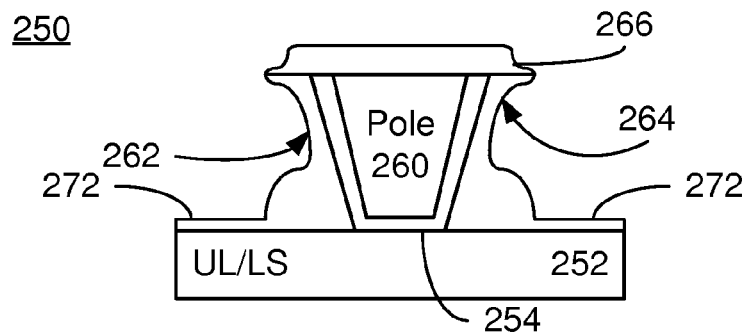

A first DBARC is spin coated, via step 152. In some embodiments, the first DBARC has a thickness of at least twenty nanometers and not more than sixty nanometers. In some such embodiments, the first DBARC is at least twenty-five nanometers and not more than thirty-five nanometers thick. However, other thicknesses are possible. FIG. 9 depicts an ABS view of the transducer 250 after step 152 is performed. Thus, a first DBARC 272 has been provided.

Figure 10:
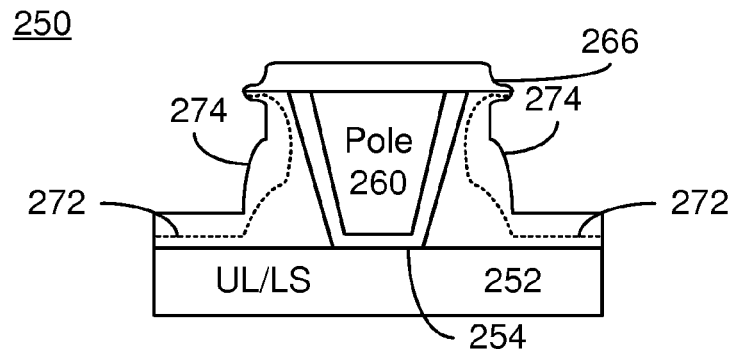

A second DBARC is spin coated on the first DBARC, via step 154. The second DBARC may be at least twenty nanometers and not more than sixty nanometers thick. In some such embodiments, the second DBARC is at least twenty-five nanometers and not more than thirty-five nanometers thick. However, other thicknesses may be used. FIG. 10 depicts an ABS view of the transducer 250 after step 154 is performed. Thus, a second DBARC 274 has been provided. Because both are DBARCs, the transition between DBARC 272 and DBARC 274 is shown as a dashed line. Further, the overhangs 262 and 264 have not been filled.

Figure 11:
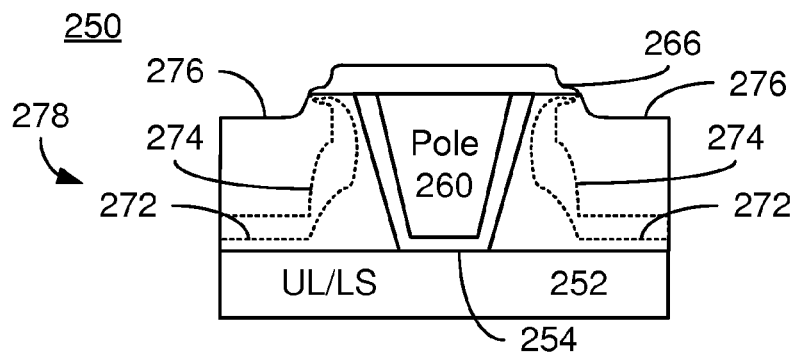

A third DBARC is optionally spin coated on the second DBARC, via step 156. The third DBARC may be at least twenty nanometers and not more than sixty nanometers thick. In some such embodiments, the third DBARC is at least twenty-five nanometers and not more than thirty-five nanometers thick. However, other thicknesses are possible. FIG. 11 depicts an ABS view of the transducer 250 after step 156 is performed. Thus, a third DBARC 276 has been provided. The transitions between the DBARCs 272, 274 and 276 are shown by dashed lines. The DBARCs 272, 274 and 276 form DBARC layer 278. The DBARC layer 278 fills the overhangs 262 and 264.

Figure 12:
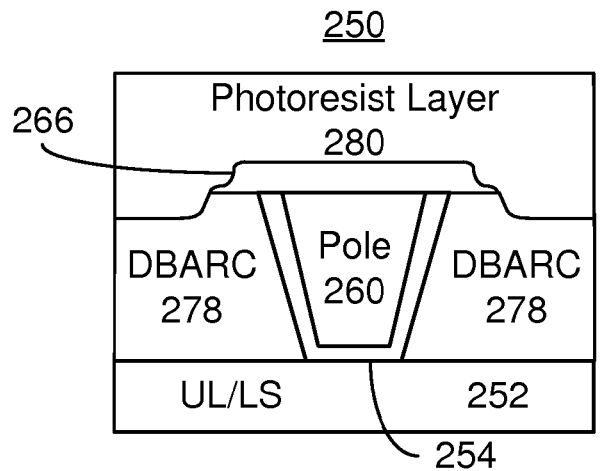
Figure 13:
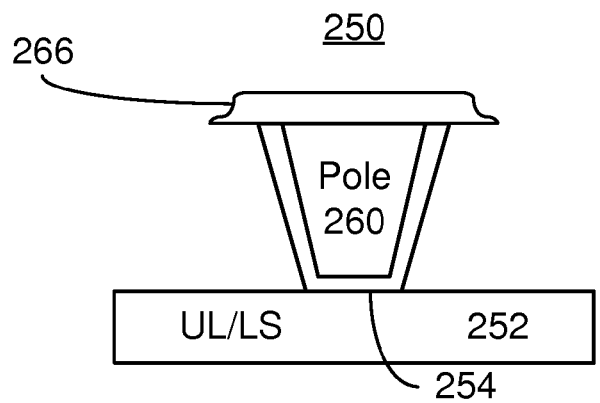

A photoresist layer is deposited, via step 158. FIG. 12 depicts an ABS view of the transducer 250 after step 158 is performed. Thus, a photoresist layer 280 is provided. For clarity, the DBARC layer 278 is shown without indicating the individual DBARCs that form the layer 278. The photoresist mask is developed by selectively exposing portion(s) of the photoresist layer 280 to light, via step 160. Consequently, the portion of the photoresist layer 280 that is in the location at which an aperture for the shields is to be formed may be removed. Consequently, this portion of the photoresist layer is removed by exposing the photoresist layer to a developer, via step 162. The photoresist mask is, therefore, formed. However, the DBARC is also removable by the developer. Consequently, the DBARC layer 278 under the aperture in the photoresist mask is also removed. FIG. 13 depicts an ABS view of the transducer 250 after step 162 is performed. Because the shields are to be formed near the pole around the ABS, the DBARC layer 178 and the photoresist layer 280 have been removed in this region. However, a portion of the photoresist layer that forms the mask and the DBARC 278 remain in other regions. Further, no photoresist remains under the gap 266.

Figure 14:
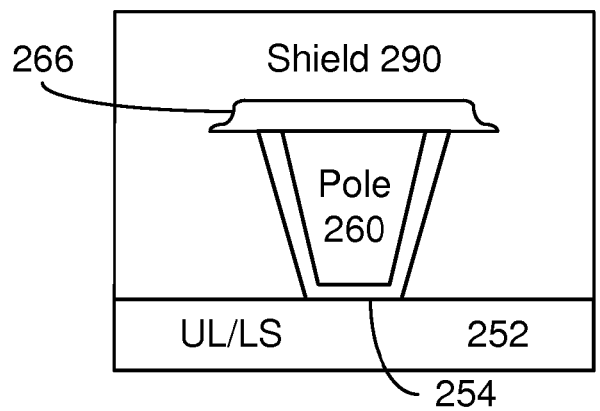

The shield(s) are provided, via step 164. Step 164 may include depositing a seed layer and plating a high permeability material, such as NiFe. FIG. 14 depicts and ABS view of the transducer 250 after step 164 is performed. Thus, shield 290 is formed. Because of the way in which the shields 290 have been formed, no photoresist residue is present under the gap 266. If only side shields are desired or the trailing shield is desired to be separated from the side shields, then a portion of the shield 290 above the main pole 260 may be removed.

Using the method 150, a magnetic transducer having improved performance may be fabricated. Use of the DBARC layer not only improves fabrication of the photoresist mask by reducing or eliminating reflections, but also prevents or mitigates the presence of photoresist residue in the overhang regions 262 and 264. The desired geometry, performance, and reliability of the transducer 250 may be more readily achieved.

We claim:

1. A method for fabricating a shield for a magnetic transducer having air-bearing surface (ABS) location, a pole and a gap, the pole having a bottom and a top wider than the bottom, the gap residing on the top of the pole and being at least as wide as the top of the pole such that an overhang is formed between a top edge of the gap and a bottom edge of the bottom of the pole, the method comprising:

providing a plurality of bottom antireflective coatings (BARCs), the plurality of BARCs forming a BARC layer, the BARC layer filling the overhang;

providing a shield photoresist mask on at least a portion of the BARC layer; and providing the shield, the shield including at least one side shield.

2. The method of claim 1 wherein the shield is a wraparound shield including the at least one side shield and a trailing shield.

3. The method of claim 1 wherein the step of providing the plurality of BARCs further includes providing at least two BARCs.

4. The method of claim 1 wherein the step of providing the plurality of BARCs further includes:

spin coating a first BARC;

spin coating a second BARC on the first BARC.

5. The method of claim 4 wherein the step of providing the plurality of BARCS further includes:

spin coating a third BARC on the second BARC.

6. The method of claim 4 wherein each of the first BARC and the second BARC has a thickness of at least twenty nanometers and not more than sixty nanometers.

7. The method of claim 6 each of the first BARC and the second BARC has the thickness of at least twenty-five nanometers and not more than thirty-five nanometers.

8. The method of claim 1 wherein the step of providing the photoresist mask further includes:

depositing a photoresist layer;

selectively exposing a portion of the photoresist layer to light; and removing the portion of the photoresist layer.

9. The method of claim 8 wherein the step of removing the photoresist layer further includes:

exposing at least the photoresist layer to a developer.

10. The method of claim 1 wherein the BARC layer is an organic BARC layer.

11. The method of claim 1 wherein the BARC layer is a developable BARC layer removable by a developer.

12. A method for fabricating a shield for a magnetic transducer having air-bearing surface (ABS) location, a pole and a gap, the pole having a bottom and a top wider than the bottom such that an overhang is formed between a top edge of the top of the pole and a bottom edge of the bottom of the pole, the gap residing on the top of the pole and being at least as wide as the top of the pole, the method comprising:

spin coating a first developable bottom antireflective coating (BARC) over the pole and the gap;

spin coating a second developable BARC on the first developable BARC, a developable BARC (DBARC) layer including the first developable BARC and the second developable BARC filling the overhang;

depositing a photoresist layer on the DBARC layer;

selectively exposing a portion of the photoresist layer to light;

removing the portion of the photoresist layer using a developer to provide a shield photoresist mask, a portion of the DBARC layer being removed by the developer; and plating a shield layer for the shield.

13. The method of claim 12 further comprising:

spin coating a third developable BARC on the second developable BARC, the first developable BARC, the second developable BARC and the third developable BARC forming the DBARC layer filling the overhang.

14. A magnetic transducer having air-bearing surface (ABS) comprising:

a pole having a bottom and a top wider than the bottom;

a write gap on the pole, the gap being at least as wide as the top of the pole such that an overhang is formed between a top edge of the gap and a bottom edge of the bottom of the pole, the overhang being free of photoresist residue;

a side gap; and a shield including at least one side shield, the side gap separating the pole from the at least one side shield.

15. The magnetic transducer of claim 14 wherein the shield further includes a trailing shield, the write gap being between the pole and the trailing shield.

* * * * *